United States Patent
Hsieh et al.

(10) Patent No.: US 9,083,917 B2
(45) Date of Patent: Jul. 14, 2015

(54) TELEVISION SYSTEM AND VIDEO PROCESSING METHOD

(75) Inventors: Ming-Jane Hsieh, Taipei (TW);
Jin-Sheng Gong, Hsinchu (TW);
Chien-Hua Hsieh, Taipei County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 2437 days.

(21) Appl. No.: 11/852,682

(22) Filed: Sep. 10, 2007

(65) Prior Publication Data

US 2008/0062319 A1 Mar. 13, 2008

(30) Foreign Application Priority Data

Sep. 11, 2006 (TW) .............................. 095133406 A

(51) Int. Cl.
*H04N 5/45* (2011.01)
*H04N 5/46* (2006.01)
*G09G 5/14* (2006.01)
*H04N 5/445* (2011.01)
*H04N 21/426* (2011.01)
*H04N 21/431* (2011.01)

(52) U.S. Cl.
CPC .. *H04N 5/46* (2013.01); *G09G 5/14* (2013.01);
*H04N 5/44513* (2013.01); *H04N 5/45* (2013.01); *H04N 21/42638* (2013.01); *H04N 21/4316* (2013.01); *G09G 2340/125* (2013.01)

(58) Field of Classification Search
CPC ........................................................ H04N 5/93
USPC ......... 348/552–570, 705, 706, 731, 732, 725, 348/726, 452
See application file for complete search history.

(56) References Cited

U.S. PATENT DOCUMENTS

| | | | | |
|---|---|---|---|---|
| 5,031,044 | A * | 7/1991 | Canfield et al. | 348/565 |
| 5,202,765 | A * | 4/1993 | Lineberry | 348/565 |
| 5,430,494 | A * | 7/1995 | Saeger et al. | 348/565 |
| 5,548,341 | A * | 8/1996 | Klink et al. | 348/565 |
| 5,847,771 | A * | 12/1998 | Cloutier et al. | 348/564 |
| 6,147,715 | A * | 11/2000 | Yuen et al. | 348/565 |
| 6,323,913 | B1 * | 11/2001 | Prange | 348/566 |
| 6,784,945 | B2 * | 8/2004 | Norsworthy et al. | 348/731 |
| 7,525,600 | B2 * | 4/2009 | Kaylani et al. | 348/554 |
| 2006/0050657 | A1 * | 3/2006 | Lee | 370/260 |
| 2007/0209072 | A1 * | 9/2007 | Chen | 726/16 |

* cited by examiner

*Primary Examiner* — Annan Shang
(74) *Attorney, Agent, or Firm* — McClure, Qualey & Rodack, LLP

(57) ABSTRACT

A video signal processing method applied for a TV system is disclosed. In this method, the received video signal is processed by a video decoding process, and then the decoded video signal is processed by a de-interlacing process. A still or correspondingly still image signal is generated and blended with the de-interlaced video signal to generate a blended signal which is displayed to make sure the OSD information can always be shown at the top layer of the screen of the LCD panel.

18 Claims, 2 Drawing Sheets

TELEVISION SYSTEM AND VIDEO PROCESSING METHOD

FIELD OF THE INVENTION

The invention relates to TV image signal processing technology; and more particularly to the circuit for synthesizing the on-screen display (OSD) with the video signal and the method thereof.

BACKGROUND OF THE INVENTION

Technology for processing on-screen display is commonly used in most LCD TV and generates controllable information or icon on the screen. Thus, the present status can be displayed when user adjusts the LCD TV. An OSD control chip or a built-in OSD control circuit in the control circuit of LCD TV becomes the key point of the user interface. However, in conventional TV system, the OSD control circuit generates OSD information and blends the OSD information with video signals, and the blended video signal is then de-interlaced. Since the OSD information is a correspondingly still image, the blending of the OSD information and the video signal with motion will cause the difficulty in motion detection of the de-interlace process. The drawback mentioned above would induce indistinct images or color mismatch.

SUMMARY OF THE INVENTION

To solve the drawbacks such as the image conflict, color mismatch, and the indistinct image occurring easily between image and information while LCD TV is displaying the OSD information, the invention provides a TV system and its video signal processing method.

One objective of the present invention is to provide a TV system including a first IC chip, a first transmission interface, a second transmission interface, a second IC chip and a display module, wherein the first IC chip comprises a first logic module and a second logic module. The first logic module is applied to process the received video signal by a first video process, and the second logic module is applied to generate a still or correspondingly still image. The first transmission interface is coupled to the first IC chip and applied to transmit the video signal processed by the first logic module with a first transmission form. The second transmission interface is coupled to the first IC chip and applied to transmit the still or correspondingly still image with a second transmission form.

The second IC chip is coupled to the first transmission interface and the second transmission interface respectively. The second IC chip comprises a third logic module and a fourth logic module. The third logic module is applied to process the video signal from the first transmission interface by a second video process. And the fourth logic module is applied to blend the video signal processed by the third logic module with the still or correspondingly still signal from the second transmission interface to generate a blended signal.

The display module is coupled to the fourth logic module and applied to display image in response to the blended signal. Therefore, the OSD information could always be displayed at the top layer of the screen of the display module and the drawbacks of the conventional technology can be solved by this way.

Another objective of the present invention is to provide a video signal processing method for a TV system. The steps of the method comprises decoding the received video signal, and de-interlacing the decoded video signal after decoding process, and generating a still or correspondingly still image signal after de-interlacing process, and blending the de-interlaced video signal with the still or correspondingly still image signal to generate a blended signal, and displaying the blended signal to make the OSD information always be shown at the top layer of the screen of the LCD panel.

To make it easier for our examiner to understand the objective of the invention, its structure, innovative features, and performance, we use preferred embodiments together with the attached drawings for the detailed description of the invention.

DETAILED DESCRIPTION OF THE PREFERRED EMBODIMENTS

Figure 1:
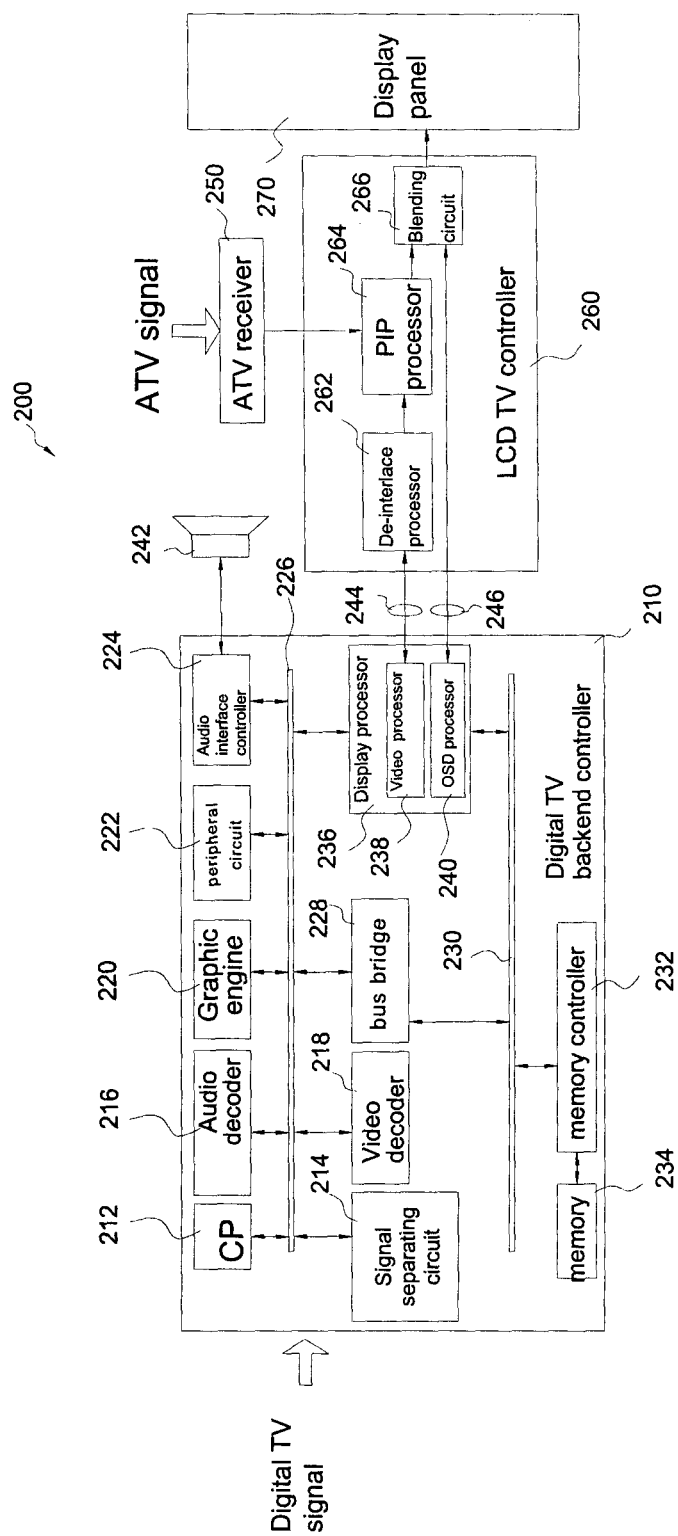
FIG. 1 is the sketch map of a TV system in an embodiment of the invention.
Figure 2:
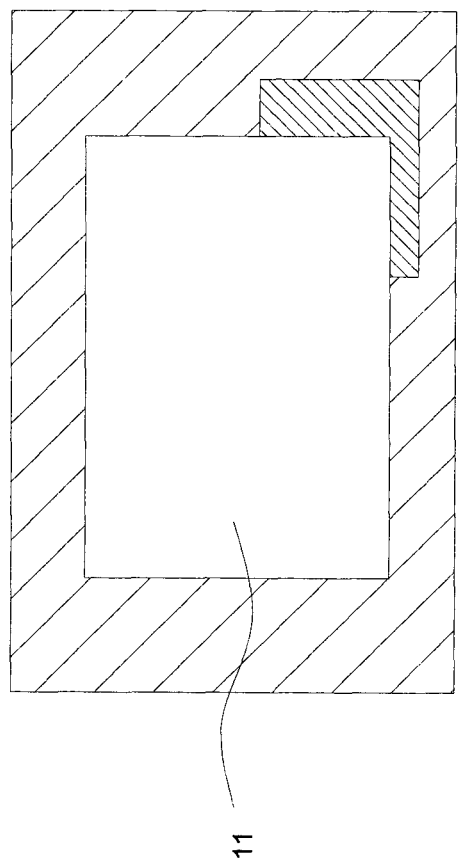
FIG. 2 is the sketch map of the OSD information.

As shown in FIG. 1, the digital TV system 200 includes an analog front end (not shown) for receiving digital TV signal, a digital TV backend controller 210, an analog TV receiver 250 (abbreviated ATV receiver), a LCD TV controller 260 and a panel 270. Generally speaking, the parts mentioned above are implemented separately in one or two integrated circuit chips. And these chips are integrated in one or several printed circuit boards. In future, the parts mentioned above may possibly be totally or partly implemented in dies of a chip. For example, integrating the main functions of the digital TV backend controller 210 and the LCD TV controller 260 with other functions in a chip, called a digital TV controller, is a possible integrating method.

In FIG. 1, the embodiment of the invention only explains the parts related to the feature of the present invention in detail and other parts of the digital TV system which are not necessary for the embodiment will not be explained in detail. In this embodiment, the digital TV backend controller 210 receives a transport packet stream, which has been demodulated and packet, from the analog front end (not shown). The main function of the digital TV backend controller 210 is to separate the video/audio/system information (V/A/SI) from the transport packet stream, and decodes the video signal and the audio signal respectively. Then, the decoded video signal is performed by the video process before transmitted to the LCD TV controller 260 for further process.

In this embodiment, the digital TV backend controller 210 includes a CPU 212, a signal separating circuit 214 for separating the information (V/A/SI), an audio decoder 216, a video decoder 218 (such as a MPEG2 decoder), a graphic engine 220 and a peripheral circuit 222 for communicating with other outside device, such as a remote controller. The parts mentioned above are coupled to an audio interface controller 224 and a display processor 236 through an internal bus 226. The digital TV backend controller 210 also includes a memory 234 for storing data, the access to the memory 234 is controlled by a memory controller 232, and the memory 234 is coupled to the display processor 236 by a memory bus 230. The internal bus 226 and the memory controller 232 communicate with each other by a bus bridge 228. The components of the digital TV backend controller 210 mentioned above are well known thus the detailed illustration will be omitted herein.

The audio interface controller 224 receives the decoded audio signal and transmits the decoded audio signal to an outside audio output device 242, such as a speaker, for broadcasting. The display processor 236 includes a video processor 238 and an OSD (on-screen display) processor 240. The video processor 238 is applied to receive a decoded video signal, and execute a particular video process on the decoded video signal before transmits the decoded video signal to the LCD TV controller 260 for further process. The video signal which processed by the video processor 238 is transmitted to the LCD TV controller 260 through the video interface 244, such as the CCIR656.

The OSD processor 240 generates a correspondingly OSD image information according to the command input. Before blending with the video signal, the OSD image information is transmitted to the LCD TV controller 260 through another individual transmission interface 246, such as the DVI or HDMI interface for transmitting digital signal.

After receiving the video signal transmitted from the digital TV backend controller 210, the de-interlace processor 262 of the LCD TV controller 260 de-interlaces the video signal. Therefore, the interlaced signal is transformed to the progressive signal which is suitable for the panel 270.

If the user desires to switch the screen into a PIP (picture-in-picture) mode, the LCD TV controller 260 blends the digital video signal with the analog video signal by the PIP processor 264, where the digital video signal is transmitted from the digital TV backend controller 210, and the analog video signal is transmitted from the analog TV receiver 250.

The video signal processed by each part mentioned above is blended with the OSD image information from the digital TV backend controller 210 by the blending circuit 266, and the blending circuit 266 transmits the blended signal to the panel 270 for display.

It is noted that the analog video signal received from the analog TV receiver will also be de-interlaced. The relative sequence of the PIP process and the other processes, such as de-interlace, is changeable when designing a system. Therefore, the scope of the present invention is not limited to the above-mentioned embodiments.

Meanwhile, the PIP screen not only can be generated according to the result of blending a digital video signal with an analog video signal, but also can be generated according to the result of blending several digital video signals and/or several analog signals. It is also noted that the image processes before de-interlacing and before or after the blending circuit 266, such as scaling, and color processing, are well known, the combination of utilizing the image processes being variable, and thus the scope of the present invention is not limited to the above-mentioned embodiments.

The LCD TV controller 260 and the digital TV backend controller 210 also can be implemented by ASIC, dedicated hardwired circuitry, microprocessor or general-purpose processing circuitry. It is also noted that the present invention can not only be utilized in the field of LCD TV, but also can be utilized in the field of flat plat displays including LCOS and plasma thin-film panel, and non-flat digital TV displays.

To prevent from the frame tear caused by the output frequency mismatch between the digital video signal and the OSD information, the LCD TV controller 260 also can feed back the timing control information generated during the operation, such as the, clock signal, H-sync signal and V-sync signal, to the OSD processor 240 for synchronization.

In the embodiment of the digital TV system 200 in accordance with the present invention, the OSD image generated by the digital TV backend controller 210 is not blended with the video signal until the OSD image is transmitted to the LCD TV controller 260 through an individual transmission interface 246. After the video signal has been de-interlaced and/or PIP processed, the processed video signal are blended with the OSD image information. Therefore, as shown in FIG. 3, the OSD image 11 is displayed on the top layer of the whole screen. And the drawbacks, such as: (1) the indistinct image or color mismatch caused by the difficulty in motion detection of the blended signal, and (2) the OSD image 11 covered partly by the image of the TV program or displayed within a narrow region in a small picture of the image of the TV program, are solved thereby.

Although the embodiment above referring to the local OSD information of the digital TV system 200, the invention also can be applied to the system information (SI) which is transmitted with the digital TV signal from the far-end terminal. The system information usually includes a still image, such as the subtitle at a corner of the screen, a time-correspondively still image, such as the closed caption which is switched over an interval of several seconds following a play, or a space-correspondively still image, such as the scrolling or text crawling located in part of the screen and moves in a steady velocity.

The above-mentioned signals, alike the OSD information, are generated or received aside from the video signals, and thus are still or correspondively still images with high predictability, and accordingly are suitable for being processed utilizing the method according to the present invention. When applying the present invention to process the system information, the display processor 236 further includes a SI processor to receive the separated SI information and to generate a SI image signal corresponding to the separated SI information, and to deliver the SI image signal to the LCD TV controller 260 through an individual transmission interface. Then, the SI image signal is blended with the video signal which has been de-interlaced.

The embodiment of the invention refers to a TV system. The digital TV backend controller 210 and the LCD TV controller 260 are realized by individual IC chips, and the transmission interface is realized by the CCIR656, HDMI or DVI. However, a combination of the digital TV backend controller 210, the LCD TV controller 260 and other parts of the digital TV system 200 in one chip also belongs to the scope of the present invention, meaning that as long as the still or correspondively still images, such as the OSD information or the SI signal, are blended with the video signal after the video signal has been de-interlaced or PIP processed, the drawbacks of the conventional apparatus or method could be solved.

While the present invention has been described by way of example and in terms of an embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A TV system comprising
a first integrated circuit (IC) chip, comprising:
   a first logic module, for executing a first video process on a received video signal; and
   a second logic module, for generating a still or a correspondively still image signal;
a first transmission interface, coupled to said first IC chip, for transmitting said video signal processed by said first logic module through a first transmission form;
a second transmission interface, coupled to said first IC chip, for transmitting said still or correspondively still image signal generated by said second logic module through a second transmission form;

a second IC chip, coupled to said first transmission interface and said second transmission interface, said second IC chip comprising:
  a third logic module, for executing a second video process on said processed video signal from said first transmission interface; and
  a fourth logic module, for blending said video signal processed by said third logic module with said still or corresponsively still image signal from said second transmission interface to generate a blended signal; and
a display panel coupled to said fourth logic module, for displaying according to said blended signal.

2. The TV system of claim 1, wherein said second transmission form applied by said second transmission interface corresponds to at least one of an HDMI standard and a DVI standard.

3. The TV system of claim 2, wherein said first transmission form applied by said first transmission interface corresponds to a CCIR656 standard.

4. The TV system of claim 1, wherein said second video process executed by said third logic module comprises a de-interface process.

5. The TV system of claim 4, wherein said first video process executed by said first logic module comprises a decoding process.

6. The TV system of claim 5, wherein said first video process executed by said first logic module corresponds to the decoding process of a MPEG2 standard.

7. The TV system of claim 1, wherein said still or corresponsively still image signal generated by said second logic module comprises an OSD image or a system information image.

8. The TV system of claim 1, wherein said second IC chip further comprises a fifth logic module to execute a picture-in-picture process on said video signal processed by said third logic module and another video signal.

9. A TV system comprising:
  a first logic module on a first integrated circuit (IC) chip, for executing a first video process on a received video signal, wherein said first video process comprises a decoding process;
  a second logic module on the first IC chip, for generating a still or corresponsively still image signal;
  a third logic module on a second IC chip, coupled to said first logic module, for executing a second video process on said video signal processed by said first logic module, wherein said second video process comprises a de-interlace process;
  a fourth logic module on the second IC chip, coupled to said second logic module and said third logic module, for blending said video signal processed by said third logic module with said still or corresponsively still image signal generated by said second logic module to generate a blended signal; and
  a display module, coupled to said fourth logic module, for displaying according to said blended signal.

10. The TV system of claim 9, wherein said decoding process executed by said first logic module corresponds to a MPEG2 standard.

11. The TV system of claim 9, wherein said still or corresponsively still image signal generated by said second logic module comprises an OSD image.

12. The TV system of claim 9, wherein said still or corresponsively still image signal generated by said second logic module comprises a system information image.

13. The TV system of claim 9, further comprising a fifth logic module for executing a picture-in-picture process on said video signal processed by said third logic module and another video signal.

14. A video process method applied in a TV system, said video process method comprising the steps of:
  executing, in a first integrated circuit (IC) chip, a decoding process on a received video signal;
  executing, in the first IC chip, a de-interlace process on said video signal after said decoding process;
  generating, in the first IC chip, a still or corresponsively still image signal;
  blending, in a second IC chip, said de-interlaced video signal on said still or corresponsively still image signal to generate a blended signal after said de-interlace process; and
  displaying an image according to said blended signal.

15. The video process method of claim 14, wherein said decoding process corresponds to a MPEG2 standard.

16. The method of claim 14, wherein said still or corresponsively still comprises an OSD image.

17. The method of claim 14, wherein said still or corresponsively still comprises a system information image.

18. The method of claim 14, further comprising a step of executing, in the second IC chip, a picture-in-picture process on said video signal and another video signal.

* * * * *